United States Patent Office 3,332,896
Patented July 25, 1967

3,332,896
OIL-MODIFIED POLYURETHANES
Joseph P. Burns and Frank T. Sanderson, Wilmington, Del., assignors to Atlas Chemical Industries, Inc., Wilmington, Del., a corporation of Delaware
No Drawing. Filed Dec. 23, 1963, Ser. No. 332,913
4 Claims. (Cl. 260—9)

This invention relates to oil-modified polyurethane coating compositions. More particularly, this invention relates to polyurethane coating compositions based upon the alcoholysis products of ethylenically unsaturated oils, commonly called drying oils and polyoxyalkylene ethers of polyhydric alcohols. This invention further relates to method for the preparation of such composition.

Oil-modified polyurethane coating materials have received wide attention in recent years because of their excellent performance characteristics with respect to abrasion resistance, resistance to a wide variety of chemicals and their outstanding toughness. Notwithstanding their obvious advantages, however, polyurethane coatings of the kind referred to have been limited in their end use applications, particularly with respect to their use as protective coatings for substrates likely to be subjected to impact shock, or to exposure to the weather, by reason of their relative inflexibility and lack of resiliency, which may cause such films to rupture upon impact or upon dimensional change occurring during rapid climatic variations, thereby exposing the substrate to the environment and defeating the purpose of the coating. Some attempts have been made to overcome the aforementioned difficulties by varying the ratio of raw materials used in preparing polyurethanes. These attempts, however, have in practice proven undesirable because the low-molecular-weight polymers resulting from such variation of the ratio of the raw materials tend to lack toughness, hardness, and resistance to aqueous attack. It is therefore, much more desirable in the preparation of polyurethane coating vehicles to use the starting materials, that is, the reactants, in those concentrations which are more likely to yield high-molecular-weight linear polymers.

Another disadvantage of oil-modified polyurethane coatings has also lain in their tendency to discolor upon exposure to sunlight. This disadvantage, which has been partially eliminated by the addition of ultraviolet light absorbers, has been attributed to the use of aromatic isocyanates in combination with other ingredients. The tendency to discolor may be overcome also by the use of aliphatic isocyanates such as hexamethylene diisocyanate. However, such isocyanate sources are currently scarce and extremely expensive. Furthermore, the aliphatic isocyanates react much more slowly with the hydroxy-containing component of the starting materials and, as a consequence, further increase production costs. Still other means have been used to prevent discoloration of the final product but these have invariably resulted in both higher production costs and the sacrifice of desirable coating properties in the final product. From the foregoing will be evident the manifest desirability of providing oil-modified polyurethane coating compositions having improved flexibility and resiliency while retaining their advantageous characteristics of toughness, abrasive and chemical resistance. Optimally, the economical preparation of such improved oil-modified polyurethane coating composition will include inexpensive means for preventing discoloration of the product.

It is, accordingly, an object of the present invention to provide oil-modified polyurethane coating compositions having improved resiliency and resistance to impact shock.

It is another object of the present invention to provide oil-modified polyurethane coating compositions having improved flexibility and resistance to weather.

It is another object of the present invention to provide oil-modified polyurethane coating compositions in which the tendency to discoloration is substantially reduced or eliminated.

It is another object of this invention to provide a method for the preparation of such compositions.

The foregoing objects and still further objects of the present invention are broadly achieved by reacting the alcoholysis product of a polyoxayalkylene ether of a polyhydric alcohol and an ethylenically unsaturated oil, i.e., a drying oil, with a polyisocyanate. In accordance with the present invention, the aforesaid alcoholysis product is prepared by means of an ester interchange reaction between the polyoxyalkylene ether of a polyfunctional alcohol having at least 3 hydroxyl groups and a drying oil. The ratio of polyoxyalkylene ether of polyhydric alcohol and drying oil components reacted is chosen in such a way that the ester interchange reaction yields a product which is almost entirely composed of dihydroxy esters, which esters are further reacted with polyisocyanate to yield polyurethane. The polymerization reaction may be run in the presence of an inert solvent, if desired.

The polyoxyalkylene ether of polyhydric alcohol may be prepared, if desired, by reacting an alkylene oxide compound with a selected polyhydric alcohol in the conventional manner. The reaction of the alkylene oxide with the modifying alcohol results in a polyhydric alcohol which retains its original functionality, but in which the functional groups are separated from the alcohol carbon chain by a polyether chain. Accordingly, when such an alkylene oxide polyhydric alcohol is used in place of the polyhydric alcohol itself in the preparation of oil-modified polyurethanes, the resultant polyurethane is one in which the urethane linkages occur less frequently and the polymer is more long chain in nature than is the case when the polyhydric alcohol is itself used to form the alcoholysis product. Polyurethanes derived from alkylene oxide polyols, therefore, exhibit increased chain mobility over those derived from the simpler polyfunctional alcohol analogs. It is believed that the increased chain mobility referred to results in an increased resiliency of the film and consequently, increased resistance to failure from shock due to stretching, shrinking, or impact.

Among the polyoxyalkylene ethers of polyhydric alcohols which are useful in the practice of the present invention are alkylene oxide polyethers derived from polyhydroxy compounds having a functionality of 3 or greater such as glycerin, pentaerythritol, sorbitol, methyl glucoside, hexanetriol, trimethylolpropane, trimethylolethane, sucrose, and similar polyfunctional alcohols.

Among the alkylene oxides which may be used in order to prepare the polyoxyalkylene ethers of polyhydric alcohols which are useful in the practice of the present invention are such oxides as ethylene oxide, propylene oxide, butylene oxide, and similar materials. In accordance with the present invention, propylene oxide is a preferred material for the preparation of the alkylene oxide polyethers used in the practice thereof, although it may be pointed out that shorter alcoholysis reaction cycles as well as shorter urethane polymerization cycles may result from the use of polyoxyethylene ethers of polyfunctional alcohols.

The overall range of alkylene oxide groups per molecule of polyether of polyhydric alcohol may vary within the range from about 3 to about 80, although no upper limit upon the alkylene oxide content of the polyethers has been established. Preferred ranges have been established for the ethylene oxide and propylene oxide content of the polyethers of a number of polyhydric alcohols as follows:

| Polyether: | Moles alkylene oxide per molecule polyether |
|---|---|
| Polyether of sorbitol | 6–20 |
| Polyether of methyl glucoside | 4–10 |
| Polyether of pentaerythritol | 4–10 |
| Polyether of sucrose | 8–20 |
| Polyether of glycerin | 3–10 |

In accordance with the present invention, a preferred polyether for use in the practice thereof is the polyoxypropylene ether of sorbitol having 6–20 propylene oxide groups per molecule thereof. It should be noted that although ordinarily it is common practice to react the alkylene oxide with a mixture of sorbitol and water containing up to 15% by weight of water to prepare polyoxyalkylene ethers of sorbitol, it has been found that when such aqueous mixture is used to prepare the polyoxyalkylene ethers of sorbitol used in the practice of the present invention, the resultant ether contains some low molecular weight glycol in deleterious proportions. Accordingly, in preparing the sorbitol mixture prior to reaction with alkylene oxide, it is suggested that the mixture contain not more than 1% by weight of water, thereby producing a polyoxyalkylene ether in which the glycol concentration is no longer deleterious.

It should be noted that although alkylene oxide derivatives of sucrose are not suitable for use in the practice of this invention when standard reaction conditions are employed in the preparation thereof, diol esters of polyethers of sucrose suitable for use in accordance with the present invention may be prepared by the method of catalytic transesterification described in an article entitled Preparation and Properties of Linoleate Esters of Sucrose, by Bobalek, Mendoza, Causa, Collings and Kapo and appearing in Industrial and Engineering Chemistry, Product Research and Development, vol. 2, No. 1, March 1963.

The drying oils which may be used in accordance with the present invention are ethylenically unsaturated oils, usually of vegetable origin, and include drying oils, such as linseed oil, and semi-drying oils, such as soybean oil, as typically representative of the group. Other oils which may be used are safflower oil, sesame oil, poppy seed oil, sunflower oil, perilla oil, corn oil and dehydrated castor oil. The so-called "bodied" derivatives of these oils may also be used. A preferred drying oil for use in accordance with the present invention is alkaline refined linseed oil.

In accordance with the present invention, the isocyanate source for reaction with the alcoholysis product of the aforesaid polyoxyalkylene ethers of polyhydric alcohols and drying oils may be derived from suitable aromatic diisocyanates such as 2,4-tolylene diisocyanate, 2,6-tolylene diisocyanate an diphenylmethane diisocyanate. Aliphatic diisocyanates such as hexamethylene diisocyanate and 4,4'-diisocyanatodicyclohexylmethane may also be used. Conveniently, and economically, a mixture containing 80% by weight of 2,4-tolylene diisocyanate and 20% 2,6-tolylene diisocyanate may be used.

Although not essential to the invention, the alcoholysis product may be modified with low molecular weight difunctional glycols such as ethylene or propylene glycol, in order to increase the final film hardness. Substituted ureas, such as tertiary butyl urea, may also be used for this purpose. In those cases in which a modifying agent is used, such modifiers should be added to the alcoholysis product at temperatures below which ester interchange may occur and in such a way that the hydroxyl number of the alcoholysis product prior to reaction with polyisocyanate is within the range of about 200 to 300.

Although the alcoholysis product resulting from the reaction of polyoxyalkylene ethers of polyhydric alcohols and drying oils of the present invention is a mixture of several components, the optimum alcoholysis product is one in which the primary products are diol esters. It is preferred to prepare the alcoholysis product by selecting the reactants in those amounts which are most suitable for the production of an end product which consists predominantly of the desired diol esters. It has been found that the optimum alcoholysis product, i.e., one in which the primary component or components thereof are diol esters, is best achieved when the amount of drying oil and polyol charged to the reaction vessel depends upon the functionality of the polyol. If too little drying oil is used, the alcoholysis product will contain a significant number of tri-hydroxy compounds and, as a consequence, when reaction with anhydride or diisocyanate is attempted, gelation will occur. On the other hand, if too much drying oil is used, sufficient monohydroxy compounds will result from the alcoholysis reaction to prevent the desired polymerization when the alcoholysis product is reacted with the diisocyanate.

It has been found that, for the purpose of obtaining the modified polyurethane composition according to the present invention, an optimum alcoholysis product is obtained by reacting said drying oil and said polyoxyalkylene ether of polyhydric alcohol in the proportion of about one mole of said polyoxyalkylene ether to about $(N/2)-1$ mole of drying oil, where N is the number of hydroxyl groups per molecule of polyoxyalkylene ether. In general, the molar ratio of drying oil to polyoxyalkylene ether of polyhydric alcohol as used in accordance with the method of the present invention, lie within limiting ranges as follows:

Polyoxyalkylene ether of
    trihydric alcohol ____ About 0.4 to about 0.8 molar proportions of drying oil per 1 molar proportion of polyoxyalkylene ether of trihydric alcohol.

Polyoxyalkylene ether of
    tetrahydric alcohol __ About .99 to about 1.35 molar proportions of drying oil per 1 molar proportion of polyoxyalkylene ether of tetrahydric alcohol.

Polyoxyalkylene ether of
    hexahydric alcohol __ About 1.95 to about 2.20 molar proportions of drying oil per 1 molar proportion or polyoxyalkylene ether of hexahydric alcohol.

Polyoxyalkylene ether of
    octahydric alcohol ___ About 2.6 to about 3.2 molar proportions of drying oil per 1 molar proportion of polyoxyalkylene ether of octahydric alcohol.

It will be evident, of course, that the method of charging the reactants in the molar proportions set forth to produce an alcoholysis product containing the optimum quantity of diol esters is applicable equally as well to the reaction of drying oils and polyhydric alcohols as to the reaction of drying oil and the polyoxyalkylene ethers of such alcohol.

In the reaction of the polyisocyanate compound with the alcoholysis product, the ratio of the polyisocyanate to the alcoholysis product is again determined by the number of hydroxyl groups present per molecule of alcoholysis product. In general, the amount of isocyanate used should be such that the isocyanate to hydroxyl ratio is within the range of about 0.9 to about 1.0. The preferred NCO/OH ratio is about 0.95.

The alcoholysis reaction may be performed at temperatures of about 200 to about 300° C. The preferred temperature, however, is about 250° C. The reaction cycle may vary from 1 to 4 hours, with a three hour cycle preferred. Calcium naphthenate catalyst may be used to facilitate transesterification. It is suggested that 0.25% of a solution containing about 4% calcium metal be used as a catalyst. Preferably, in accordance with the method of the present invention, the alcoholysis mixture is sparged with inert gas during the reaction in order to prevent discoloration and "bodying" of the product. The gas may be bubbled through the reaction mixture at a rate of from about 5 cc. to about 10 cc. per minute. It has been found that darkening of the alcoholysis product is minimized by the bubbling of inert gas through the reaction mixture during all phases of the reaction.

The reaction between the alcoholysis product and the diisocyanate are carried out at temperatures below 90° C. The preferred reaction temperature is within the range of about 70 to about 80° C. Preferably, the polyisocyanate is added stepwise to alcoholysis product at initial temperatures within the range of about 40 to 50° C., thereby preventing the heat of reaction from raising the temperature of the reactants above about 80° C.

Lead and tin may be used as catalysts for the reaction between the alcoholysis product and the polyisocyanate. Lead may be added in the form of a lead naphthenate solution containing about 24% lead. The suggested concentration of lead in the final product is about 0.04%. A similar concentration of tin may be substituted for the lead catalyst. However, the tin may be used in the form of dibutyl tin dilaurate. The rate of disappearance of polyisocyanate is considerably greater for the lead-catalyzed reaction than for the tin-catalyzed reaction.

The polymerization cycle may vary from 2 to 8 hours and reaction should be continued until the viscosity of the product remains constant and the isocyanate concentration is less than 0.1%.

The oil-modified polyurethane compositions of the present invention may be stabilized by the addition of small amounts of methanol, or other monohydroxy compounds, following the desired polymerization reaction. The addition of methanol removes the last traces of free isocyanate from the reaction product and such additions may be made at concentrations of about 0.1 to about 1.0% by weight.

The following are representative examples of oil-modified polyurethane coating compositions and their method of preparation as provided in accordance with this invention:

EXAMPLE 1

Alkaline refined linseed oil, 1135 grams, and polyoxypropylene (10) sorbitol (1% $H_2O$), de-ashed, 471 grams, were mixed together in a three-liter round bottomed flask fitted with stirrer, thermocouple, inert gas inlet and reflux condenser. (The ratio of ingredients corresponds to a ratio of 2.05 molar proportions of oil to one molar proportion of polyoxypropylene (10) sorbitol.)

The ingredients were mixed and carbon dioxide gas bubbled into the mixture at a rate of 5–10 cc. per minute. A total of 4 grams of a 4% solution of calcium as calcium naphthenate catalyst were added, and the reactants brought to a temperature of 250° C. over a one hour period. Reaction was continued for three hours at this temperature, and then the product was cooled to room temperature (25° C.). The alcoholysis product was soluble in equal volumes of methanol, and possessed a hydroxyl value of 136 and an acid value of 0.88.

The alcoholysis product, 225 grams, was charged to a one-liter round bottomed flask fitted with inert gas inlet, stirrer, thermowell, and dropping funnel-exhaust. The dropping funnel was charged with 44 grams of a mixture of toluene diisocyanate isomers containing 80% 2,4- and 20% 2,6-toluene diisocyanate. This mixture will hereafter be called "TDI." The ratio of ingredients represents an NCO/OH ratio of 0.93.

The alcoholysis product was stirred, and carbon dioxide gas bubbled into the reactants at a rate of 5–10 cc. per minute. The "TDI" was added dropwise through the dropping funnel into the reaction mixture over a period of 15 minutes, at which time the reaction temperature was 56° C. The reactants were warmed to 70° C. and held at this temperature for an additional 15 minutes. At this time, 0.1 cc. of a 24% solution of lead as lead naphthenate and 269 grams of mineral spirits were added. The mixture was heated to 70° C., and reaction continued at this temperature for six hours. The product had a Gardner viscosity of W, and contained less than 0.1% free isocyanate.

The resin solution was further diluted with mineral spirits to a final polyurethane concentration of 40% by weight. This diluted solution was charged with driers and antiskinning agent in such a way that the resultant vehicle contained 0.2% "Exkin No. 1" antiskinning agent based on the total solution, 0.4% lead, 0.02% cobalt, and 0.2% manganese, based on the polyurethane concentration.

EXAMPLE 2

A mixture containing 1141 grams of alkaline refined linseed oil, 561 grams of polyoxypropylene methyl glucoside at hydroxyl number of 400, and 4.25 grams of a 4% solution of calcium as calcium naphthenate were reacted under conditions identical to those described under Example 1. The reaction product had an acid value of 0.79 and hydroxyl number of 135. Approximately 1.3 moles of oil were reacted with each mole of polyol.

A one liter reaction vessel set up as described under Example 1, was charged with 220 grams of the above alcoholysis product. "TDI," 44.5 grams, was charged to this product from a dropping funnel over a ten minute period, at which time reaction temperature was 44° C. The reactants were heated to 70° C. and held at this temperature for 15 minutes. At this time, 0.1 cc. of 24% solution of lead as lead naphthenate, and 265 grams of mineral spirits were added. Reaction temperatures were raised to 80° C., and these conditions were maintained for 2½ hours. The product of this reaction had a Gardner viscosity of Z–2. The reaction was performed at NCO/OH of 0.96.

EXAMPLE 3

A mixture containing 1317 grams of alkaline refined linseed oil, 411 grams of polyoxypropylene (6) sorbitol (1% $H_2O$), de-ashed, and 4.3 grams of a 4% solution of calcium as calcium naphthenate was reacted under conditions identical to those described under Example 1. The product was soluble in two volumes of methanol, had an acid value of 0.56 and a hydroxyl number of 142.

A mixture of 225 grams of this product, 47.5 grams of "TDI," 272.5 grams of mineral spirits, and 0.1 cc. of a 24% solution of lead as lead naphthenate, was reacted in a manner identical to that described in Example 2. However, the reaction cycle was five hours. The final product had a Gardner viscosity of F.

EXAMPLE 4

The alcoholysis product of Example 3, 210 grams, was blended at 25° C. with 10 grams of propylene glycol. The clear solution was reacted with 66.6 grams of "TDI," 287 grams of mineral spirits, and 0.1 cc. of a 24% solution of lead as lead naphthenate, using conditions identical to those described in Example 3. After a four hour reaction cycle, the product exhibited a Gardner viscosity of Z–2.

EXAMPLE 5

The alcoholysis product of Example 3, 200 grams, was blended with 14.3 grams of N-t-butyl urea at 25° C. A hazy mixture resulted. The reaction vessel was set up as in those previously described. A total of 63 grams of "TDI" was charged to a dropping funnel and added dropwise to the reaction mixture at 35° C. After five to ten minutes the reaction temperature had increased to 65° C., and 100 grams of mineral spirits were added to cool the reactants. "TDI" addition was continued, and after a total of 20 minutes, all 63 grams of "TDI" had been added, and reaction temperature was 70° C. An additional 177 grams of mineral spirits were added as well as 0.1 cc. of a lead naphthenate solution containing 24% lead. Reaction temperature was raised to 80° C. After five hours at this temperature, the reaction mixture became quite clear. The reaction was continued for one additional hour, and discontinued. The final product had a Gardner viscosity of J.

The product in each of Examples 1 to 5, suitably charged with driers and antiskinning agents, was used to coat glass and metal and the coated articles were subjected to test by conventional procedures as described below. Three commercial resins and a control resin were treated in the same way and subjected to the same tests. The results of the aforesaid tests performed on the resins of the present invention and upon the representative commercial resins and control resin are collected in Table I which appears below.

Drying time

A 3 mil wet film was drawn on glass plate using a "Bird Film Applicator" (see pages 96–97 of Physical and Chemical Examination of Paints, Varnishes, Lacquers, and Colors, Gardner and Sward, twelfth edition, March 1962, Gardner Laboratory). The film was allowed to stand at approximately 25° C. and 50% relative humidity. Drying time is reported as the time difference between the initial preparation, and the time cotton will no longer adhere to the film.

Mandrel bend flexibility test

Three brush coats of resin were applied to 30-gauge tin plate according to the following schedule:

1st coat applied
2nd coat applied 4–6 hours after 1st coat
3rd coat applied 16–22 hours after 2nd coat After two weeks conditioning at 25° C. and 50% relative humidity, the panels were bent over the ⅛ inch mandrel of a "Coverall" tester. The bent panels were then shaped into wedges using the wedge shaping tool of this device (see page 142 of the Gardner and Sward publication, supra). Results were expressed as the length of film broken.

Reverse impact

Three brush coats of resin were applied to the 30-gauge tin plate according to the schedule previously described. After two weeks conditioning at 25° C. and 50% relative humidity, the samples were tested for reverse impact resistance using the "Coverall" tester (see pages 142 and 147 of the Gardner and Sward publication, supra). The panels were placed in the tester, and the impact rod allowed to strike the reverse side (uncoated) of the panel from the various heights required to cause film failure. Results were reported in "inch/pounds."

TABLE I

|  | Drying Time, hr. | 39 Day Sward Hard. | Falling Sand Abrasion Index | Mandrel Bend, length of break, in. | Reverse Impact (in./lb.) |
| --- | --- | --- | --- | --- | --- |
| Resin of Example 1 | 1½ | 36 | 4 | 0.8 | Over 100 |
| Resin of Example 2 | ½ | 35 | 29 | 0.13 | Over 100 |
| Resin of Example 3 | ⅔ | 36 | 24 | 2.75 | 72–100 |
| Resin of Example 4 | ½ | 68 | 20 | 3.25 | 67–72 |
| Resin of Example 5 | ½ | 72 | 31 | 1.75 | 28–32 |
| Control Resin | ⅔ | 60 | 21 | 3.5 | 50–60 |
| Commercial Resin A | ½ | 60 | 13 | 3.6 | 40–50 |
| Commercial Resin B | ½ | 60 | 17 | 3.6 | 28–32 |
| Commercial Resin C | ½ | 55 | 5 | 3.6 | 25–30 |

30 day Sward hardness

A 3 mil wet film was drawn on glass plate using the "Bird Film Applicator." The film was allowed to dry 30 days at approximately 25° C. and 50% relatively humidity. At this time, the Sward Hardness of the film was determined (described at page 138 of the Gardner and Sward publication, supra). Clean glass plate was used as the Standard at Sward reading of 100. Thus, the rocker was placed on the glass plate and adjusted to give 50 swings in 60±0.5 seconds. To use glass standard at 100, all readings were multiplied by two. Results reported are the average of three tests.

Falling sand abrasion index

Three brush coats of resin were applied to Taber steel panels by the following schedule:

1st coat applied
2nd coat applied 4–6 hours after 1st coat
3rd coat applied 16–22 hours after 2nd coat The panels were conditioned two weeks at approximately 25° C. and 50% relative humidity, then placed beneath a glass tube 6 feet long with a ⅞ inch inner diameter. The panels were placed immediately beneath the tube, and at an angle of 45 degrees to the vertical. Ottawa sand (20 mesh) was dropped through the tube onto the panels. Results were expressed as:

$$\text{Sand index} = \frac{\text{milligram weight loss}}{100 \text{ liters of sand}}$$

It will be understood that drying agents, antiskinning agents, conventional solvents and pigments and flow control agents as well as stabilizing materials may be added to the oil-modified polyurethane compositions as provided in accordance with this invention to produce a final product suitable to the intended use. The final product may be applied to substrates by conventional techniques, such as brushing, spraying or rolling. A hard coating is produced by solvent evaporation combined with the conventional drying oil mechanism.

It will be apparent that the oil-modified polyurethane compositions of the present invention are especially advantageous in that they not only possess their well-known characteristics of toughness, abrasion resistance and chemical resistance, but are, moreover, resilient and flexible and thereby suitable to end application use as coatings for substrates subject to impact shock and exposure to climatic variation. Moreover, the compositions of the present invention have the advantage of lightness in color and high resistance to discoloration.

It will be understood that the compositions of the pressent invention as described herein and defined in the claims which follow include those compositions containing the named ingredients in the proportions stated and any other ingredients which do not destroy the effectiveness of the compositions for the purpose stated in the specification and, although this invention has been described with reference to specific reactant materials, including specific polyoxyalkylene ethers of specific polyhydric alcohols, drying oils and isocyanate-group-contain-

What is claimed is:

1. A polyurethane coating composition comprising the reaction product of a diisocyanate selected from the group consisting of aliphatic and aromatic diisocyanates and the alcoholysis product of a drying oil selected from the group consisting of linseed oil, soybean oil, safflower oil, sesame oil, poppy seed oil, sunflower oil, perilla oil, corn oil and dehydrated castor oil and a polyoxyalkylene ether of a polyhydric alcohol selected from the group consisting of the polyoxypropylene ether of sorbitol having from 6 to 20 mols of propylene oxide per mol of ether and polyoxypropylene ether of methyl glucoside having from 4 to 10 mols of propylene oxide per mol of ether wherein the proportion of polyoxyalkylene ether to drying oil used in producing said alcoholysis product is about $(N/2)-1$, where N is the number of hydroxyl groups per molecule of polyoxyalkylene ether, and wherein the numerical ratio of isocyanate groups to hydroxyl groups in said reaction product is within the range of about 0.9 to 1.0.

2. The composition of claim 1 wherein said alcoholysis product is formed by the reaction of a drying oil and a polyoxyalkylene ether of methyl glucoside in the proportions of about 0.99 to 1.35 moles of drying oil to 1 mole of polyether.

3. The composition of claim 1 wherein said alcoholysis product is formed by the reaction of a drying oil and a polyoxyalkylene ether of sorbitol in the proportions of about 1.95 to 2.20 moles of drying oil to 1 mole of polyether.

4. A composition consisting essentially of the reaction product of a mixture of about 80% 2,4-toluene diisocyanate and about 20% 2,6-toluene diisocyanate and the alcoholysis product of linseed oil and a polyoxypropylene ether of sorbitol containing from about 6 to about 20 propylene oxide groups per molecule thereof, wherein the proportion of polyoxypropylene ether to linseed oil used in producing said alcoholysis product is about $(N/2)-1$, where N is the number of hydroxyl groups per molecule of polyoxypropylene ether, and wherein the numerical ratio of isocyanate groups to hydroxyl groups in said reaction product is within the range of about 0.9 to about 1.0.

References Cited

UNITED STATES PATENTS

| 2,970,062 | 1/1961 | Hauge et al. | 106—252 X |
| 3,022,326 | 2/1962 | Schroeder et al. | 260—18 X |
| 3,054,756 | 9/1962 | Holtschmidt et al. | 260—2.5 |
| 3,143,517 | 8/1964 | Heiss | 260—18 |
| 3,248,348 | 4/1966 | Piechota et al. | 260—18 X |
| 3,248,349 | 4/1966 | Szabat et al. | 260—18 X |

FOREIGN PATENTS 953,357  3/1964  Great Britain.

DONALD E. CZAJA, *Primary Examiner.*

LEON J. BERCOVITZ, *Examiner.*

C. W. IVY, *Assistant Examiner.*

UNITED STATES PATENT OFFICE
CERTIFICATE OF CORRECTION

Patent No. 3,332,896                      July 25, 1967

Joseph P. Burns et al.

It is hereby certified that error appears in the above numbered patent requiring correction and that the said Letters Patent should read as corrected below.

Column 3, line 55, for "an" read -- and --; column 6, line 15, for "0.2%" read -- 0.02% --; column 8, TABLE I, the second column should appear as shown below instead of as in the patent:

| Drying Time, hr. |
| --- |
| 1-2 |
| 1-2 |
| 2-3 |
| 1-2 |
| 1-2 |
| 2-3 |
| 1-2 |
| 1-2 |
| 1-2 |

Signed and sealed this 11th day of March 1969.

(SEAL)
Attest:

EDWARD M. FLETCHER, JR.                EDWARD J. BRENNER
Attesting Officer                      Commissioner of Patents